(12) United States Patent
Assaf et al.

(10) Patent No.: US 6,764,087 B2
(45) Date of Patent: Jul. 20, 2004

(54) CARGO CARRIER SUSPENSION

(75) Inventors: Imad Assaf, Calgary (CA); Daniel William Britton, Calgary (CA)

(73) Assignee: 634182 Alberta Ltd., Calgary (CA)

( * ) Notice: Subject to any disclaimer, the term of this patent is extended or adjusted under 35 U.S.C. 154(b) by 0 days.

(21) Appl. No.: 10/014,817

(22) Filed: Dec. 14, 2001

(65) Prior Publication Data

US 2003/0111813 A1 Jun. 19, 2003

(51) Int. Cl.[7] .................... B60G 11/02; B62B 7/00; B62K 27/00
(52) U.S. Cl. ............... 280/204; 280/656; 280/124.17; 267/41; 267/242
(58) Field of Search ................ 280/204, 283, 280/284, 285, 286, 288, 288.2, 292, 124.12, 124.125, 124.17, 124.175, 647, 650, 656, 657, 658, 63, 79, 79.2, 47.38, 47.41; 267/41, 242, 243

(56) References Cited

U.S. PATENT DOCUMENTS

| | | | | |
|---|---|---|---|---|
| 1,413,451 A | * | 4/1922 | Arnot | 267/242 |
| 1,951,477 A | * | 3/1934 | Gannett | 267/41 |
| 2,160,608 A | * | 5/1939 | Watson | 267/242 |
| 2,569,168 A | * | 9/1951 | Hellwig | 267/192 |
| 2,698,186 A | * | 12/1954 | Pehl | 280/43 |
| 3,168,300 A | * | 2/1965 | Giovinazzo | 267/48 |
| 3,305,230 A | * | 2/1967 | Musser | 267/41 |
| 3,315,973 A | * | 4/1967 | Marple | 280/656 |
| 3,532,357 A | * | 10/1970 | Williams et al. | 280/124.165 |
| 4,114,918 A | * | 9/1978 | Lutz | 280/284 |
| 4,948,162 A | * | 8/1990 | McCanse | 280/86.1 |
| 5,221,100 A | | 6/1993 | McNutt | |
| 5,522,614 A | * | 6/1996 | Eyman et al. | 280/642 |
| 5,580,075 A | | 12/1996 | Turner et al. | |
| 5,816,356 A | * | 10/1998 | Jansson et al. | 180/227 |
| 5,934,757 A | * | 8/1999 | Smith | 297/452.13 |
| 6,155,581 A | * | 12/2000 | Beaudoin et al. | 280/204 |
| 6,220,580 B1 | * | 4/2001 | Balczun | 267/7 |
| 6,273,441 B1 | * | 8/2001 | Neavitt et al. | 280/124.174 |
| 6,367,831 B1 | * | 4/2002 | Lim et al. | 280/124.102 |
| 2002/0163158 A1 | * | 11/2002 | Durrin | 280/204 |

* cited by examiner

Primary Examiner—Laura B. Rosenberg
(74) Attorney, Agent, or Firm—Bennett Jones LLP

(57) ABSTRACT

A cargo carrier suspension for installation on a cargo carrier having a seat and wheels, skis or rollers on which the seat rides, the cargo carrier suspension comprising: a leaf spring connectable on a cargo carrier between the seat and the wheels, skis or rollers, and a clamping device for engagement on the leaf spring and adjustable to select the degree of flexibility of the leaf spring.

66 Claims, 6 Drawing Sheets

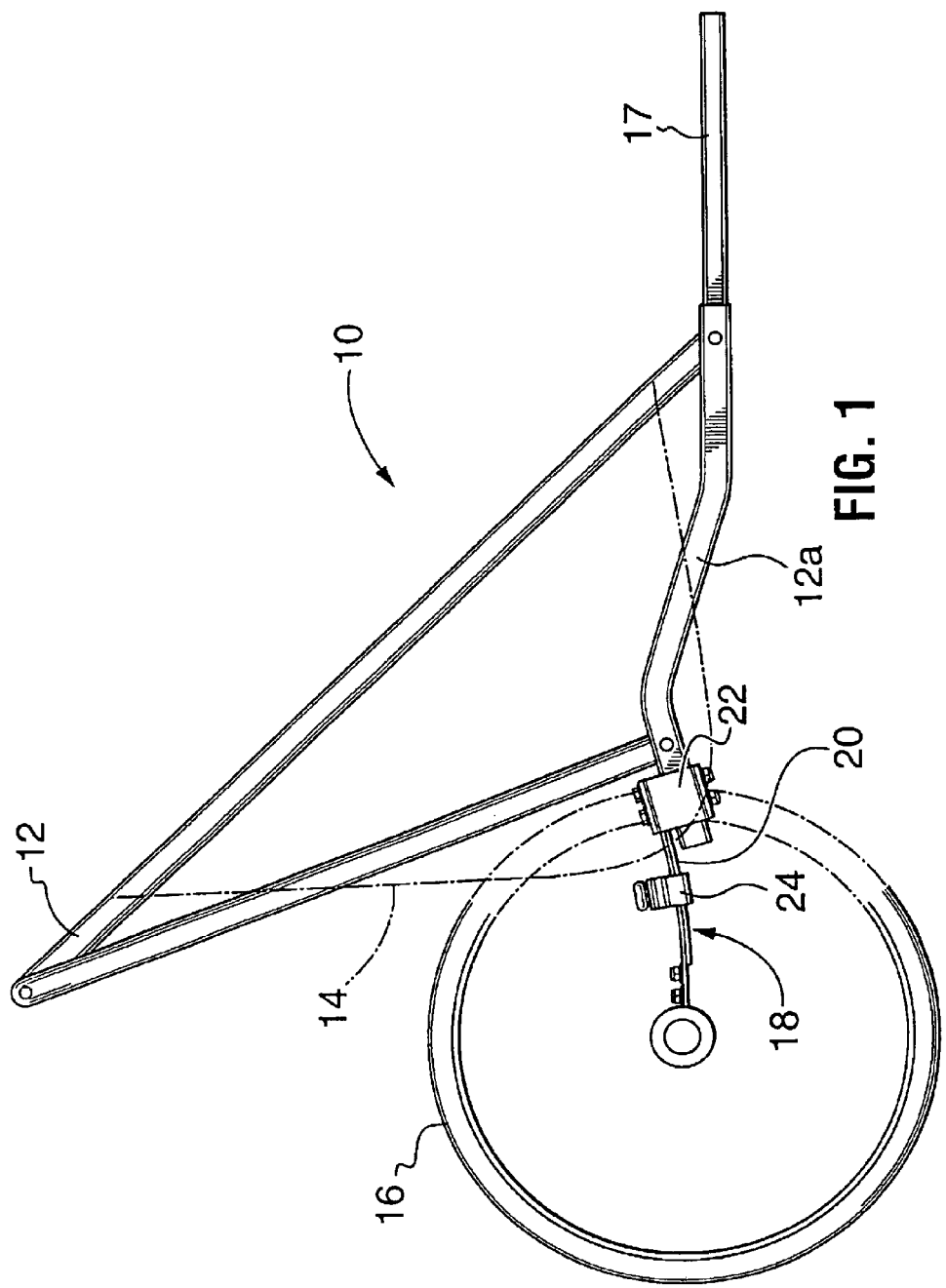

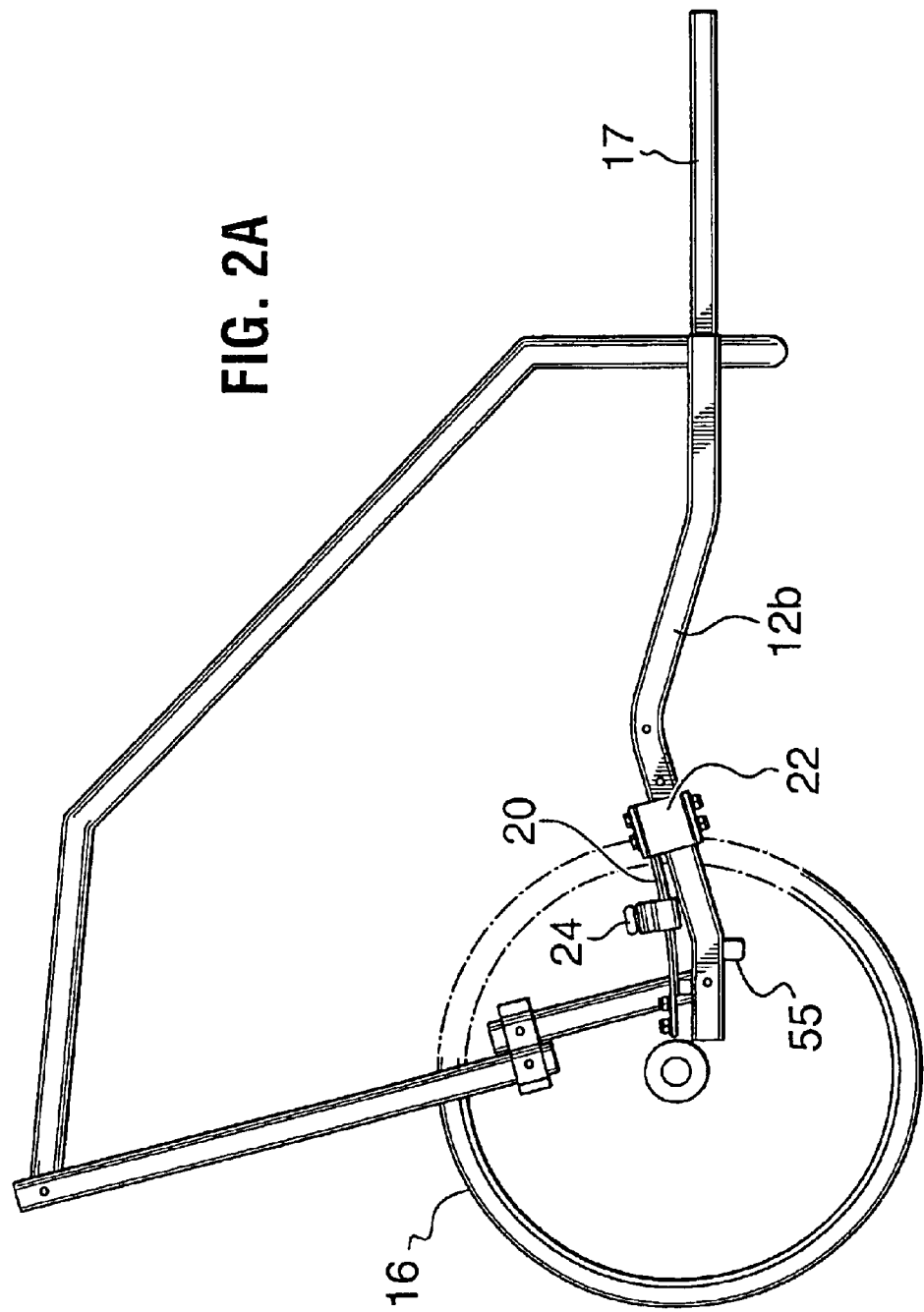

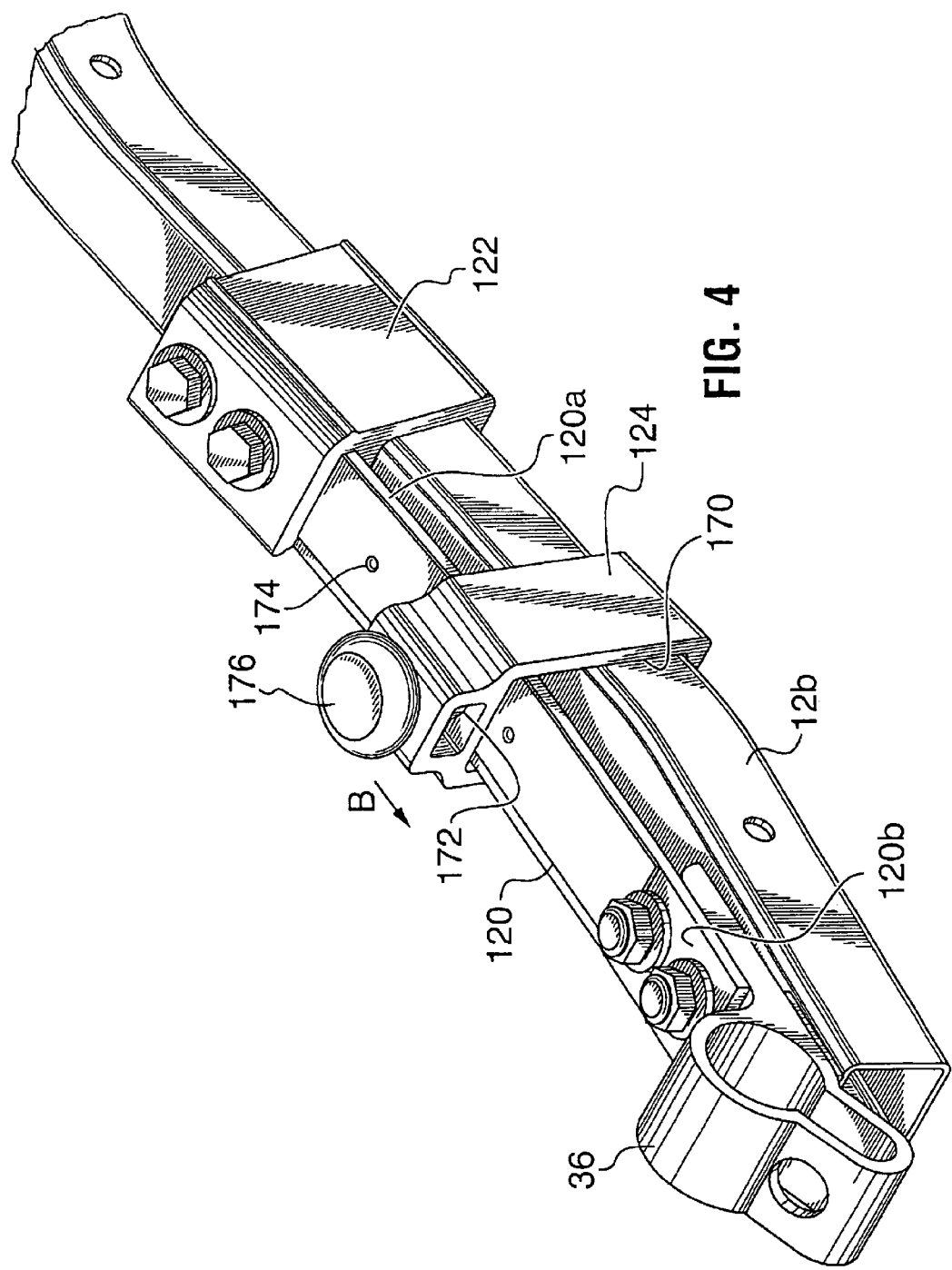

CARGO CARRIER SUSPENSION

FIELD OF THE INVENTION

The invention relates to a cargo carrier suspension and, in particular, to a cargo carrier suspension having an adjustment for suspension resistance.

BACKGROUND OF THE INVENTION

Suspensions are provided on cargo carriers such as bicycle trailers or strollers. The suspension provides a smoother ride for the occupant or load. Sometimes, the suspension includes a means for resistance adjustment.

SUMMARY OF THE INVENTION

A cargo carrier suspension has been invented. The suspension acts between the cargo support area, for example the seat, and the transport means on which the carrier rides such as, for example, wheels, rollers, skis etc.

In accordance with a broad aspect of the present invention, there is provided a cargo carrier suspension for installation on a cargo carrier having a cargo support and a transport means on which the cargo support rides, the cargo carrier suspension comprising: a leaf spring connectable on a cargo carrier between the seat and the transport means; and a clamping device for engagement on the leaf spring and adjustable to select the degree of flexibility of the leaf spring.

In accordance with another broad aspect, there is provided a cargo carrier comprising: a cargo support; a transport means on which the cargo support is supported to ride; a suspension for damping vibration between the transport means and the cargo support, the suspension including a leaf spring connected to act between the cargo support and the transport means and a clamping device for engagement on the leaf spring and adjustable to select the degree of flexibility of the leaf spring.

The suspension acts between the cargo support and the transport means to damp vibration from the transport means to the cargo support. The cargo support can be, for example, a floor or a seat. The cargo support can be rigid or flexible, as formed of fabric. However, if the cargo support is flexible it includes a rigid member, such as a support frame, onto which the suspension is connectable. As an example, the cargo support can be rigid and the suspension connectable directly thereto, the cargo support can include a support frame to which the suspension is connectable or the cargo—support can be mounted in a frame for the cargo carrier and the suspension is connectable between the cargo carrier frame and the transport means. The transport means can be any apparatus on which the seat can ride. As an example, transport means can include wheels, skis and rollers.

The suspension is connectable to the cargo carrier in any way such as, for example, by forming integral therewith, by welding or fusing or by fasteners such as clamps, bolts, screws, straps or rivets.

The leaf spring can be formed of spring steel or other materials having resilient, spring properties such as, for example, polymers or metals. The leaf spring can include one leaf or a plurality of leaves forming a spring pack.

The clamping device is selected to be engageable on, and adjustable to select the degree of flexibility of, the leaf spring. In one embodiment, the clamping device acts to select the degree of flexibility of the leaf spring by controlling its free flexing length. In another embodiment, the clamping device acts to select the degree of flexibility of the leaf spring by controlling the stiffness of the spring, for example, as determined by the number of leaves acting in the spring pack or the frictional engagement of the plurality of springs in the spring pack. The clamp can be engageable on the leaf spring in various ways such as, for example, by bolting thereon, by engagement of a pin in a detent or by spring biasing.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 1 is side elevation of a cargo carrier according to the present invention with a suspension;

FIG. 2a is side elevation of a cargo carrier according to the present invention with a suspension;

FIG. 4 is a perspective view of another suspension according to the present invention;

DETAILED DESCRIPTION OF THE PREFERRED EMBODIMENTS

Figure 2B:
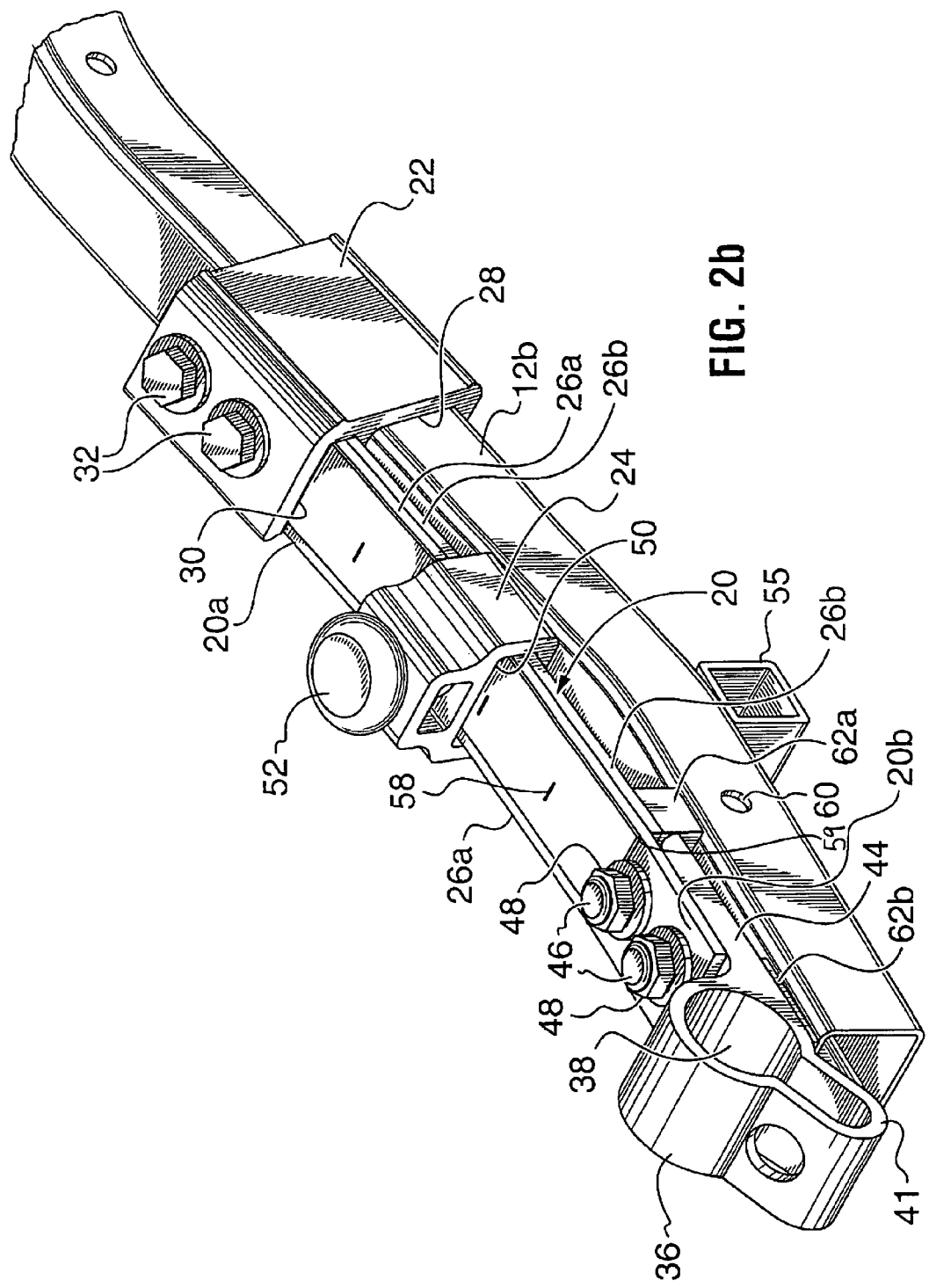
FIG. 2b is a perspective view of a suspension according to the present invention.

Referring to FIG. 1 there is shown a cargo carrier 10 in the form of a bicycle trailer for carrying a child. Cargo carrier 10 includes a frame 12, a seat 14 supported on the frame and wheels 16 acting as transport means to support and permit transport of the carrier. While there are two wheels 16 on the cargo carrier, in the drawing one is disposed behind the other. The Illustrated cargo carrier Is specifically is a trailer for towing behind a bicycle, and therefore includes a tow arm 17. It is to be understood that while a bicycle trailer has been shown, a cargo carrier according to the present invention can also be other forms of trailers, a stroller or a sled such as for example, a three or four wheeled stroller, a cargo trailer having a cargo support floor rather than a seat, a trailer having any number of wheels or a trailer for human towing such as a rickshaw.

The cargo carrier has further installed thereon a suspension 18 for damping vibration, which would tend to be transferred from wheels 16 to seat 14. In particular, suspension 18 is connected between a wheel axle (cannot be seen) and frame 12. The cargo carrier preferably has no rigid connection between wheels 16 and seat 14 such that the suspension is free to act.

The suspension includes a leaf spring 20 connected by bracket 22 adjacent its first end to a lower section 12a of the frame. The leaf spring can be connected by other means such as by direct engagement by fasteners, welding, fusing or strapping, to the frame. However, care should be taken to ensure that the connection will accommodate the stress, which can be significant, without unacceptably low durability. The leaf spring is connected, again in any desired way, at its second end to the wheel axle. Again, while various connection arrangements are possible, care should be taken to address the material stress at this connection.

Leaf spring 20 is formed of any desired material having spring properties, but capable of supporting the frame. As an example, the leaf spring can be formed of spring steel, or polymeric materials. The leaf spring can include one or more spring leaves.

In the most usual arrangement, there is a leaf spring connected adjacent each wheel or at least each rear wheel of the cargo carrier. However, other arrangements can be used, such as one leaf spring centrally located between the wheels or a plurality of leaf springs spaced apart between the wheels and along the wheel axle or one or more leaf springs mounted up closer to the seat.

The wheel axle can be a common axle or cross member extending between the two wheels. Alternately, the leaf springs can be connected to an independent stub axle for each wheel. In such an embodiment, care should be taken to avoid twisting and fatigue of the leaf springs.

To provide some rigidity to the frame and to prevent a feeling of unstability, in one embodiment a stabilizer bar (cannot be seen in FIG. 1) is mounted to the lower frame 12a. The stabilizer bar can be a member fastened to the lower frame or formed integral therewith. Of course, if the frame could be formed very rigid, this stabilizer bar could be omitted.

The suspension further includes a clamping device 24 that is engaged on leaf spring 20 and is adjustable to control the degree of flexibility in the spring and thereby the stiffness of the suspension. In one embodiment shown in FIGS. 1, 2 and 3, the leaf spring is formed as a spring pack containing a plurality of spring leaves and the clamping device is adjustable to control the degree to which the plurality of spring leaves are connected to act together in the spring pack. In another embodiment shown in FIG. 4, the clamping device is adjustable to control the free flexing length of the spring. In yet another embodiment, the spring is formed as a spring pack containing a plurality of spring leaves and the clamping device is adjustable to control the degree of frictional engagement between the spring leaves, thereby adjusting the flexibility of the leaf spring.

It is useful to select the stiffness of a suspension to adjust the ride and/or to maintain a selected suspension flexibility, when the weight of the load is changed (i.e. to prevent the trailer from bottoming out when a heavier load is carried). In general, a stiffer suspension is desired when transporting a heavier load.

Referring to FIGS. 2 and 3, leaf spring 20 is formed as a spring pack containing a plurality of spring leaves 26a, 26b. While two leaves are shown, other numbers can be used as desired. As will be appreciated, each of the spring leaves will have a characteristic spring force or degree of flexibility. However, when connected to act together, the spring pack provides a degree of flexibility, which is greater than that of either of the spring leaves alone.

Spring leaves 26a, 26b are connected together at end 20a by bracket 22. This bracket also serves to connect leaf spring 20 to frame 12b of a cargo carrier. The bracket includes an opening 28 for accepting frame 12b therethrough and an opening 30 for leaves 26a, 26b. The bracket, spring leaves and frame include alignable apertures through which bolts 32 are inserted and secured by nuts 34. Through this connection any force in leaves 26a, 26b at end 20a will be transmitted to frame 12b through the bracket.

Leaf spring 20 is connected at its opposite end 20b to a bracket 36. Bracket 36 includes an opening 38 in which a wheel axle 40 and a hollow axle 42 are secured. The bracket can be formed in any way to secure the axle and to serve other purposes such as, for example, in the illustrated embodiment, the bracket includes an extension 41 for retaining a parking brake.

While the bracket can be secured to the leaf spring in various ways such as by forming one integral with the other, fusing, welding, riveting, fastening etc, in the illustrated embodiment, bracket 36 is secured to leaf spring 20 via a flange 44 having apertures which can be aligned with apertures on the leaf spring 20 to accept bolts 46 and nuts 48.

While leaf spring 20 includes a spring pack of leaves 26a, 26b, it is to be noted that only one of the leaves 26a, is directly connected to bracket 36 and thereby to the wheels. The other spring leaf 26b is only connected indirectly to the wheel through engagement by a clamping device 24 to spring leaf 26a.

Clamping device 24 is engaged to leaf spring 20 and, in particular, secures spring leaf 26b to spring leaf 26a so that they can flex together. Clamping device 24 controls the degree to which the spring leaves are connected to act together in the spring pack in response to the application of force.

In the illustrated embodiment, clamping device 24 includes an opening 50 sized to accommodate the spring leaves in a such a way that the clamping device surrounds the spring leaves, but that the clamping device can be moved along the leaves if not engaged in a position. Clamping device 24 further includes a knob 52 with a threaded stem that is threadedly engaged in a threaded aperture (cannot be seen) through device 24. The aperture is formed such that the stem can be threaded into opening 50 to engage against spring leaf 26a to hold the clamping device in a selected position on leaf spring 20 and to clamp leaves 26a, 26b together. To adjust the position of the clamping device along the leaf spring, the stem can be withdrawn from engagement with leaf 26a and the device can be slid along to another position. While one clamping device has been shown and described, it is to be understood that any device that operates to clamp the leaf springs together can be used. For example, a U-shaped clamp can be used in a similar fashion as device 24, a bolt, or other removable fastener such as a clip or wire, can be inserted through a selected one of a plurality of aligned pairs of apertures formed through the spring leaves and a spring-biased pin could be used in place of the stem.

A stabilizer bar 55 is secured between lower frame member 12b and the lower frame member on the other side of the trailer.

Figure 3A:
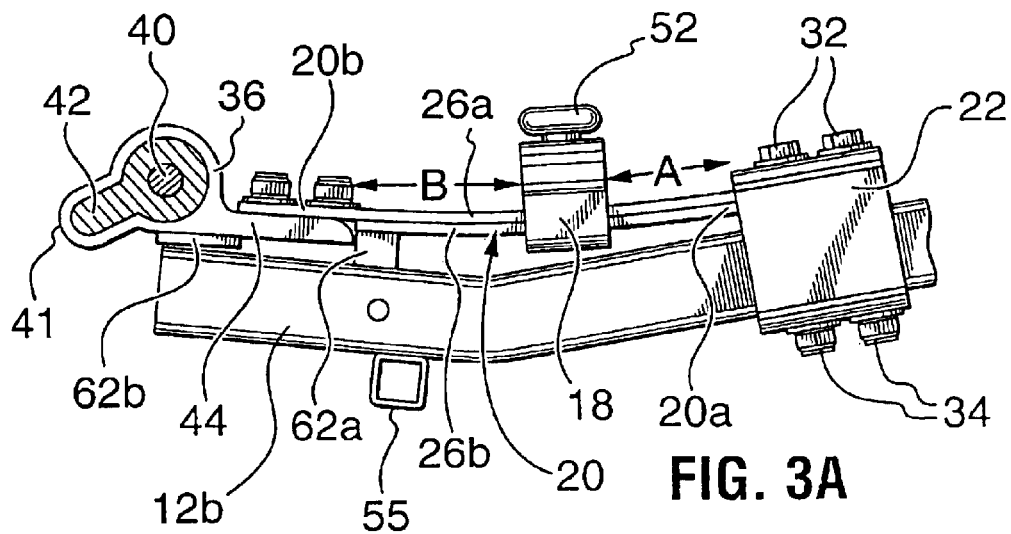
FIGS. 3a, 3b and 3c are side elevations of the suspension of generally as shown in FIG. 2 in progressively flexed conditions.
Figure 3B:
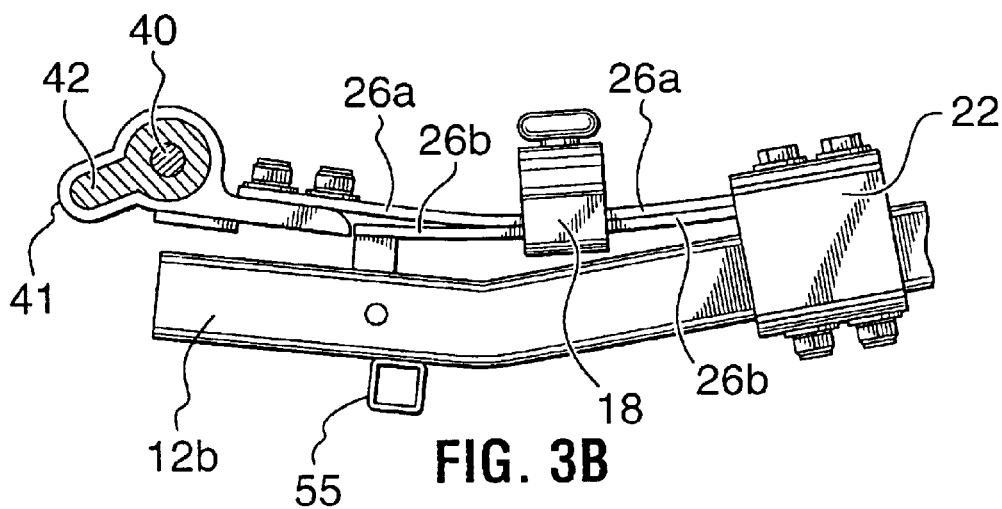
Figure 3C:
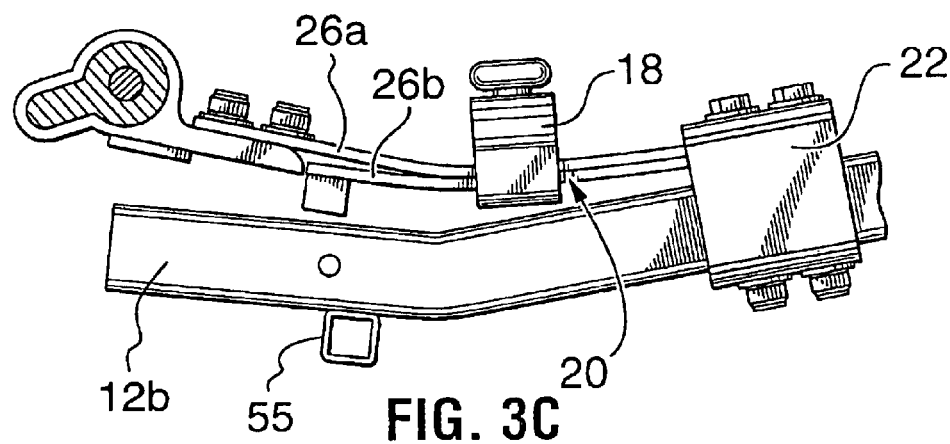

FIGS. 3a to 3c are provided to facilitate understanding of the invention. FIG. 3a shows the suspension at a generally neutral position wherein insufficient force is applied to the cargo carrier wheel, and thereby to bracket 36, to cause flexing of leaf spring 20 out of its neutral position. However, in FIG. 3b some force is applied upwardly to the bracket to cause leaf spring to flex and in FIG. 3c a force greater than the force in FIG. 3b is applied to the bracket. The force could be, for example, that applied to the wheel by pulling or pushing the cargo carrier over a bump or curb.

Clamping device 24 is engaged at a selected position along leaf spring 20 and clamps leaves 26a, 26b together at this position. Thus, on one side of clamping device 24, indicated as A, leaves 26a, 26b act together in response to applied force and exhibit a first degree of flexibility, while on the other side, B, spring leaf 26a acts alone in response to applied force and exhibits a second degree of flexibility which is greater than that of portion A. This is illustrated in the drawings. When no force is applied to leaf spring 20, as in FIG. 3a, the leaves 26a, 26b remain in their neutral position. In the illustration, the leaf spring is maintained in a flexed position, termed preloading, to provide the spring with a selected stiffness, which is greater than the stiffness that it would have without the preload effect. Because of preloading, the spring leaves lie close together in the neutral position. While preloading is useful with some springs to accommodate a change in cargo weight (i.e. putting a child in the seat) without activating the suspension, it is to be noted that it is not necessary to preload the spring pack.

When force is applied to the wheel and thereby to the bracket, as shown in FIG. 3b, spring 20 will flex to absorb the force. On side A, the leaves 26a, 26b being clamped together at both ends will flex together. However, on side B, leaf 26a which is secured between device 24 and bracket 36 will separate from leaf 26b and flex to an amount greater than that of side A. In FIG. 3c, the applied force is greater and so the effect is greater.

The overall flexibility of leaf spring 20 is determined by the proportion of the spring that is acting as a leaf pack relative to the portion of the spring that is acting as a single spring. The flexibility of leaf spring 20 can, therefore, be adjusted by securing the clamping device at various positions along the spring. In particular, moving clamping device 24 closer to end 20a, thereby reducing the length of side A, causes spring 20 to have increased flexibility, such as would be useful for carrying lighter loads, and moving the clamping device in the opposite direction, toward the bracket 36 and the free end of spring leaf 26b, decreases the spring flexibility.

Markings 58 can be placed along a visible surface of the leaf spring as shown or on frame 12b to guide a user on an appropriate placement of the clamping device 24 for a specified load. Leaf springs 26a, 26b can be treated or surface coated to enhance appearance or wear characteristics. In the illustrated embodiment, a rubber sheet 59 is secured to leaf spring 26a to protect the surface of the spring and to enhance the grip between device 24 and the spring.

In the illustrated embodiment, frame 12b extends out under leaf spring 20. Although this is not necessary, as shown in FIG. 1, the frame in the embodiment of FIGS. 2 and 3 permits connection of some upper frame members (not shown) of the cargo carrier though aperture 60. In addition, frame 12b, underlying leaf spring 20, limits the range of movement of the spring. In particular, the spring is free to flex upwardly, away from the frame, but is limited in its downward flex by abutment against the frame. Bumpers 62a, 62b, such as rubber or polymeric pads, can be secured between the leaf spring and the frame to reduce the noise caused by the spring hitting against the frame. In addition, bumpers, such as bumper 62a, can be sized to urge the spring into a preload (preflexed) condition.

Referring to FIG. 4, another suspension is shown including a leaf spring 120 and a clamping device 124. The clamping device 124 permits the flexibility of the leaf spring to be adjusted, depending on the clamped position of the clamping device along the leaf spring.

Leaf spring 120 includes one, as shown, or more spring leaves connected at one end by a bracket 122 to a frame 12b of a cargo carrier. At its other end, spring 120 is connected to a bracket 36 for accepting a wheel axle (not shown) of a cargo carrier. If the leaf spring includes more than one spring leaf, all of the leaves are secured together to respond to application of force.

Leaf spring 120 extends adjacent to frame 12b. Clamping device 124 includes an opening 170 sized to fit closely around both leaf spring 120 and frame 12b to clamp them together. This clamping causes end 120a to be fixed against flexing in response to application of force, while free end 120b, between bracket 36 and clamping device 124, is free to flex in response to any force applied. As will be appreciated, the length of end 120b determines the stiffness of the suspension. In particular, as clamping device 124 is moved in direction B to shorten end 120b, the stiffness of the suspension will increase and the flexibility of the leaf spring will decrease.

To permit the clamping device to be locked in a selected position, a spring-biased pin 172 is mounted to releasably engage in detents 174 on the leaf spring. Pin 172 is manipulated by grasping knob 176.

Figure 5:
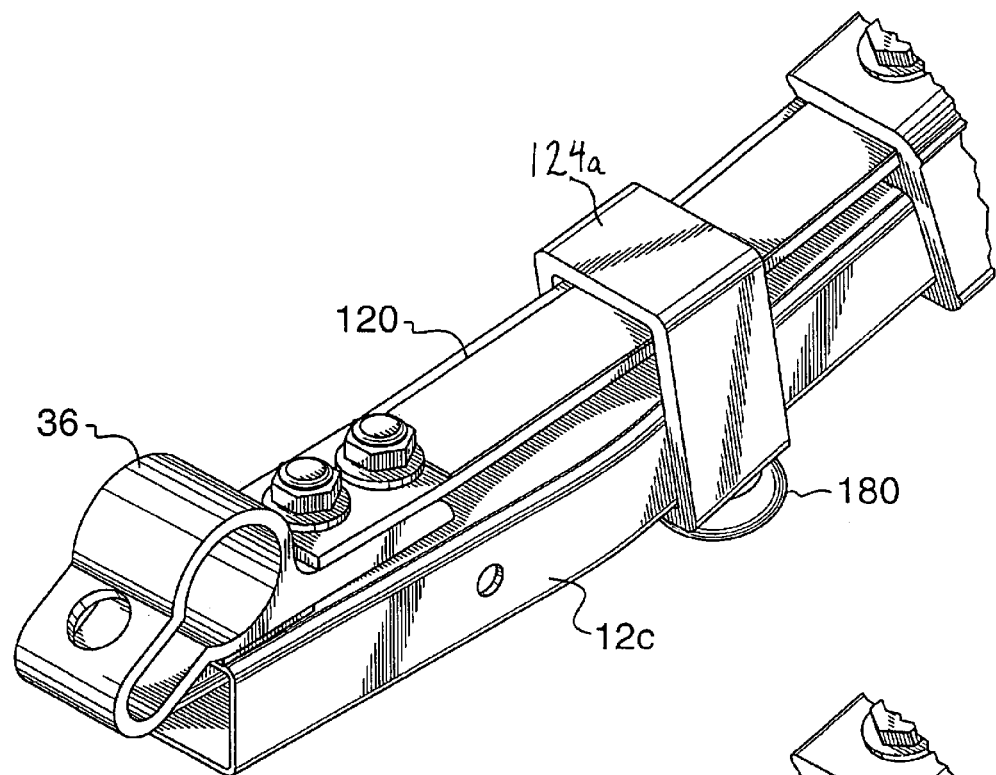
FIG. 5 is a perspective view of another suspension according to the present invention.
Figure 6:
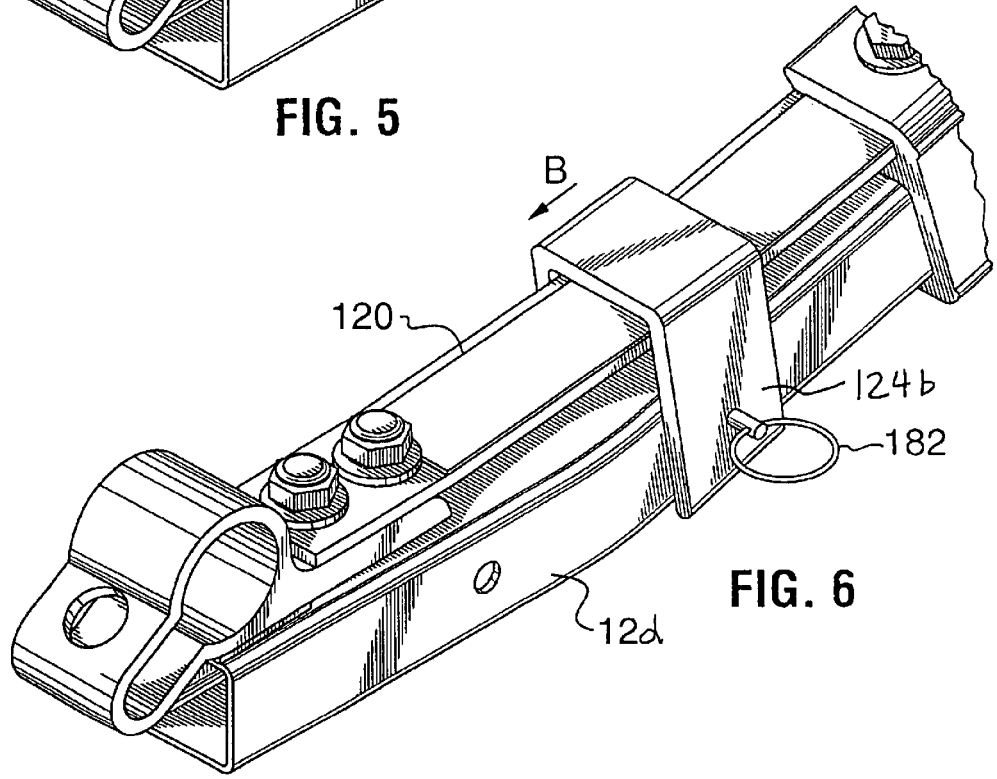
FIG. 6 is a perspective view of another suspension according to the present invention.

In another embodiment shown in FIG. 5 the clamping device 124a is secured to frame 12c by a knob/fastener 180. The fastener can be, for example, a bolt, a spring loaded pin or a push button. In yet another embodiment shown in FIG. 6, the clamping device 124b is secured to frame 12d by a lock pin 182 that is inserted through alignable apertures in the clamp and the frame.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A child carrier suspension for installation on a child on which the frame rides, the child carrier suspension comprising: a leaf spring connectable to the child carrier frame to act between the seat and the transport means; and a clamping device for engagement on the leaf spring by controlling its free flexing length.

2. The child carrier suspension of claim 1 wherein the leaf spring includes at least one spring leaf.

3. The child carrier suspension of claim 1 wherein the transport means includes at least one wheel.

4. A child carrier suspension for installation on a child carrier having a seat, a frame for supporting the seat and a transport means on which the frame rides, the child carrier suspension comprising: a leaf spring connectable to the child carrier frame to act between the seat and the transport means; and a clamping device for engagement on the leaf spring and adjustable to select the degree of flexibility of the leaf spring by controlling the stiffness of the spring.

5. A child carrier suspension for installation on a child carrier having a seat, a frame for supporting the seat and a transport means on which the frame rides, the child carrier suspension comprising: a leaf spring connectable to the child carrier frame to act between the seat and the transport means; and a clamping device for engagement on the leaf spring and adjustable to select the degree of flexibility of the leaf spring, wherein the leaf spring is formed as a spring pack including a plurality of spring leaves and the clamping device acts to select the degree of flexibility of the leaf spring to control the degree to which the plurality of spring leaves are connected to act together in the spring pack.

6. The child carrier suspension of claim 5 wherein the clamping device includes a bolt for engagement on the leaf spring.

7. The child carrier suspension of claim 5 wherein the clamping device includes a pin for engagement on the leaf spring.

8. The child carrier suspension of claim 5 wherein the child carrier is a stroller.

9. The child carrier suspension of claim 5 wherein the child carrier is a bicycle trailer.

10. A child carrier suspension for installation on a child carrier having a seat, a frame for supporting the seat and a transport means on which the frame rides, the child carrier suspension comprising: a leaf spring connectable to the child frame to act between the seat and the transport means; a clamping device for engagement on the leaf spring and adjustable to select the degree of flexibility of the leaf spring; and markings for guiding the positioning of the clamping device along the leaf spring to achieve a selected degree of flexibility.

11. A child carrier comprising: a child support including a seat and a frame; a transport means on which the child support is supported to ride; a suspension for damping vibration between the transport means and the child support, the suspension including a spring connected to act between the child support and the transport means and a clamping device for engagement on the spring and adjustable to select the degree of flexibility of the spring by controlling its free flexing length.

12. A child carrier comprising: a child support including a seat and a frame; a transport means on which the child support is supported to ride; a suspension for damping vibration between the transport means and the child support, the suspension including a spring connected to act between the child support and the transport means and a clamping device for engagement on the spring and adjustment to select the degree of flexibility of the spring by controlling the stiffness of the spring.

13. A child carrier comprising: a child support including a seat and a frame; a transport means on which the child support is supported to ride; a suspension for damping vibration between the transport means and the child support, the suspension including a spring connected to act between the child support and the transport means and a clamping device for engagement on the spring and adjustable to select the degree of flexibility of the spring, wherein the spring is formed as a spring pack including a plurality of spring leaves and the clamping device acts to select the degree of flexibility of the spring by controlling the degree to which the plurality of spring leaves are connected to act together in the spring pack.

14. The child carrier of claim 13 wherein the child support is a seat.

15. The child carrier of claim 13 wherein the spring includes at least one spring leaf.

16. The child carrier of claim 13 wherein the transport means includes at least one wheel.

17. The child carrier of claim 13 wherein the clamping device includes a bolt for engagement on the spring.

18. The child carrier of claim 13 wherein the clamping device includes a pin for engagement on the spring.

19. The child carrier of claim 13 configured as a stroller.

20. The child carrier of claim 13 configured as a bicycle trailer.

21. A child carrier comprising: a child support including a seat and a frame; a transport means on which the child support is supported to ride; a suspension for damping vibration between the transport means and the child support, the suspension including a leaf spring connected to act between the child support and the transport means; a clamping device for engagement on the leaf spring and adjustable to select the degree of flexibility of the leaf spring; and markings for guiding the positioning of the clamping device along the leaf spring to achieve a selected degree of flexibility.

22. A cargo carrier suspension for installation on a cargo carrier having a cargo support and a transport means on which the cargo support rides, the cargo carrier suspension comprising: a leaf spring including a fixed end and an opposite end, the leaf spring connected at its fixed end to the cargo carrier and connected at its opposite end to the transport means; and a clamping device for engagement on the leaf spring and adjustable to select the degree of flexibility of the leaf spring by controlling its tree flexing length.

23. The cargo carrier suspension of claim 22 wherein the clamping device is clampable at a plurality of positions at selected distances from the fixed end.

24. The cargo carrier suspension of claim 22 wherein the cargo support is a seat.

25. The cargo carrier suspension of claim 22 wherein the transport means includes at least one wheel.

26. The cargo carrier suspension of claim 25 wherein the opposite end is connected to a journal for an axle of the at least one wheel.

27. The cargo carrier suspension of claim 22 wherein the clamping device further acts to select the degree of flexibility of the leaf spring by controlling the stiffness of the spring.

28. The cargo carrier suspension of claim 22 wherein the leaf spring is formed as a spring pack including a plurality of spring leaves and the clamping device further acts to select the degree of flexibility of the leaf spring by controlling the degree to which the plurality of spring leaves are connected to act together in the spring pack.

29. The cargo carrier suspension of claim 22 wherein the clamping device includes a bolt for engagement on the leaf spring.

30. The cargo carrier suspension of claim 22 wherein the clamping device includes a pin for engagement on the leaf spring.

31. The cargo carrier suspension of claim 22 further comprising markings for guiding the positioning of the clamping device along the leaf spring to achieve a selected degree of flexibility.

32. A cargo carrier suspension for installation on a cargo carrier having a cargo support and a transport means on which the cargo support rides, the cargo carrier suspension comprising: a leaf spring including a fixed end and an opposite end, the leaf spring connected at its fixed end to the cargo carrier and connected at its opposite end to the transport means; and a clamping device for engagement on the leaf spring and adjustable to select the degree of flexibility of the leaf spring by controlling the stiffness of the spring.

33. The cargo carrier suspension of claim 32 wherein the leaf spring is formed as a spring pack including a plurality of spring leaves and the clamping device acts to select the degree of flexibility of the leaf spring by controlling the degree to which the plurality of spring leaves are driven together to frictionally engage each other in the spring pack.

34. A cargo carrier suspension for installation on a cargo carrier having a cargo support and a transport means on which the cargo support rides, the cargo carrier suspension comprising: a leaf spring including a fixed end and an opposite end, the leaf spring connected at its fixed grid to the cargo carrier and connected at its opposite end to the transport means, the leaf spring being formed as a spring pack including a plurality of spring leaves; and a clamping device for engagement on the leaf spring and adjustable to select the degree of flexibility of the leaf spring by controlling the degree to which the plurality of spring leaves are connected to act together in the spring pack.

35. The cargo carrier suspension of claim 34 wherein the clamping device is clampable on the leaf spring at a plurality of positions at selected distances from the fixed end.

36. The cargo carrier suspension of claim 34 wherein the transport means includes at least one wheel.

37. The cargo carrier suspension of claim 36 wherein the opposite end is connected to a journal for an axle of the at least one wheel.

38. A cargo carrier suspension for installation on a cargo carrier having a cargo support and a transport means on which the cargo support rides, the cargo carrier suspension comprising: a leaf spring including a fixed end and an opposite end, the leaf spring connected at its fixed end to the cargo carrier and connected at its opposite end to the transport means and the leaf spring being formed as a spring pack including a plurality at spring leaves; and a clamping device for engagement on the leaf spring to control the degree to which the plurality of spring leaves are connected to act together in the spring pack.

39. The cargo carrier suspension of claim 38 wherein the transport means is connected to a selected one of the spring leaves of the spring pack and the clamping device is adjustable to select the degree of flexibility of the leaf spring by selecting a clamping position of the clamp along the spring pack.

40. The cargo carrier suspension of claim 38 wherein the transport means includes at least one wheel.

41. The cargo carrier suspension of claim 40 wherein the opposite end is connected to a journal for an axle of the at least one wheel.

42. The cargo carrier suspension of claim 38 wherein the clamping device includes a bolt for engagement on the leaf spring.

43. The cargo carrier suspension of claim 38 wherein the clamping device includes a pin for engagement on the leaf spring.

44. The cargo carrier suspension of claim 38 further comprising markings for guiding the positioning of the clamping device along the leaf spring to achieve a selected degree of flexibility.

45. A cargo carrier suspension for installation on a cargo carrier having a cargo support including a frame end a transport means on which the cargo support rides, the cargo carrier suspension comprising: a leaf spring including a fixed end and a length, the leaf spring connected at its fixed end to the frame of the cargo carrier and including a connection along its length to the transport means; and a clamping device for clamping the leaf spring to the frame along its length between its fixed end and its connection to the transport means and the clamping means being adjustable to permit selection of the degree of flexibility of the leaf spring.

46. The cargo carrier suspension of claim 45 wherein the cargo support is a seat.

47. The cargo carrier suspension of claim 45 wherein the transport means includes at least one wheel.

48. The cargo carrier suspension of claim 47 wherein the leaf spring includes an opposite end to which the transport means is connected, the opposite end including a journal for accommodating an axle of the at least one wheel.

49. The cargo carrier suspension of claim 45 wherein the clamping device acts to select the degree of flexibility of the leaf spring by controlling its free flexing length.

50. The cargo carrier suspension of claim 45 wherein the clamping device acts to select the degree of flexibility of the leaf spring by controlling the stiffness of the spring.

51. The cargo carrier suspension of claim 45 wherein the leaf spring is formed as a spring pack including a plurality of spring leaves and the clamping device acts to select the degree of flexibility of the leaf spring by controlling the degree to which the plurality of spring eaves are connected to act together in the spring pack.

52. The cargo carrier suspension of claim 45 wherein the clamping device includes a bolt for engagement of the leaf spring to the frame.

53. The cargo carrier suspension of claim 45 wherein the clamping device includes a pin for engagement of the leaf spring to the frame.

54. The cargo carrier suspension of claim 45 further comprising markings for guiding the positioning of the clamping device along the leaf spring to achieve a selected degree of flexibility.

55. A cargo carrier suspension for installation on a cargo carrier having a cargo support, including a frame, and a transport means on which the cargo support rides, the cargo carrier suspension comprising: a spring including a fixed end connected to the frame of the cargo carrier to extend out adjacent the frame, the spring being connected to act between the cargo carrier and the transport means being free to flex in a first direction away from the frame, but limited in flex in a direction opposite to the first direction by abutment against the frame; and a clamping device for engagement on the spring and adjustable to permit selection of the degree of flexibility of the spring controlling its free flexing length.

56. The cargo carrier suspension of claim 55 further comprising a bumper positioned between the spring and the frame.

57. The cargo carrier suspension of claim 56 wherein the bumper is sized to urge the spring into a preload condition.

58. The cargo carrier suspension of claim 55 wherein the cargo support is a seat.

59. The cargo carrier suspension of claim 55 wherein the transport means includes at least one wheel.

60. The cargo owner suspension of claim 59 wherein the spring includes an opposite end and the opposite end includes a journal for an axle of the at least one wheel.

61. The cargo carrier suspension of claim 55 wherein the clamping device clamps the spring to the frame.

62. The cargo carrier suspension of claim 55 wherein the clamping device includes a bolt for engagement on the leaf spring.

63. The cargo cattier suspension of claim 55 wherein the clamping device includes a pin for engagement on the leaf spring.

64. A cargo carrier suspension for installation on a cargo carrier having a cargo support, including a frame, and a transport means on which the cargo support rides, the cargo carrier suspension comprising: a leaf spring including a fixed end connected to the frame of the cargo carrier to extend out adjacent the frame, the leaf spring being connected to act between the cargo carrier and the transport means being free to flex in a first direction away from the frame, but limited in flex in a direction opposite to the first direction by abutment against the frame; and a clamping device for engagement on the leaf spring and adjustable to permit selection of the degree of flexibility of the leaf spring, wherein the clamping device acts to select the degree of flexibility of the leaf spring by controlling the stiffness of the spring.

65. A cargo carrier suspension for installation on a cargo carrier having a cargo support, including a frame, and a transport means on which the cargo support rides, the cargo carrier suspension comprising: a leaf some including a fixed end connected to the frame of the cargo carrier to extend out adjacent the frame, the leaf spring being connected to act between the cargo carrier and the transport means being free to flex in a first direction away from the frame, but limited in flex in a direction opposite to the first direction by abutment against the frame; and a clamping device for engagement on the leaf spring and adjustable to permit selection of the degree of flexibility of the leaf spring, wherein the leaf spring is formed as a spring pack including a plurality of spring leaves and the clamping device acts to select the degree of flexibility of the leaf spring by controlling the degree to which the plurality of spring leaves are connected to act together in the spring pack.

66. A cargo carrier suspension for installation on a cargo carrier having a cargo support, including a frame, and transport means on which the cargo support rides, the cargo carrier suspension comprising: a spring including a fixed end connected to the frame of the cargo carrier to extend out adjacent the frame, the spring being connected to act between the cargo carrier and the transport means being free to flex in a first direction away from the frame, but limited in flex in a direction opposite to the first direction by abutment against the frame; a clamping device for engagement on the spring and adjustable to permit selection of the degree of flexibility of the spring; and markings for guiding the positioning of the clamping device along the spring to achieve a selected degree of flexibility.

* * * * *